June 28, 1960  H. EICKEN-ESTIENNE  2,942,352
MATERIAL TREATING SYSTEM
Filed Oct. 24, 1957  3 Sheets-Sheet 3

United States Patent Office 2,942,352
Patented June 28, 1960

2,942,352
MATERIAL TREATING SYSTEM
Henri Eicken-Estienne, 5 Chemin Malombre, Geneva, Switzerland
Filed Oct. 24, 1957, Ser. No. 692,207
Claims priority, application Switzerland Oct. 26, 1956
3 Claims. (Cl. 34—52)

This invention relates to the treatment of materials and more particularly to controlling the moisture content of materials.

The need to control the amount of moisture in a material arises in many industries. For example, after textile fabrics have been treated with a water repellant, mothproofed or dyed, it is necessary to remove moisture. This may be necessary in order that the textile fabric, after processing, will contain a predetermined amount of moisture or substantially no moisture. For example, the next processing step may require that the material have a ten percent moisture content. Therefore, not only should the material be dried but the degree of dryness must meet specified requirements.

Machines are presently available which feed the material through a moisture conditioning chamber and measure the moisture content as the material leaves the chamber. If the material is too dry the feed rate is speeded up so that the material remains in the drying chamber for a shorter time. Similarly, an indication of a moisture content greater than the desired amount leads to a slowing of the feed rate of the material. Usually an automatic control system is employed which is responsive to the moisture measuring means to control the material feeding mechanism so that the processing requires a minimum of operator supervision.

The moisture measuring means which have in the past been located at the output of the moisture conditioning chamber, relied on an electrical characteristic of the material such as its conductivity to generate a control signal which was transmitted to the control system which controlled the feeding mechanism. Although the conductivity and other electrical characteristics of these materials are a function of the moisture content, several other factors are involved. Thus, conductivity depends on the chemical and physical properties of the material as well as the amount of current flow. Therefore, the measurements of different materials obtained in practice vary considerably with the same percentage of moisture.

Moreover, since the moisture measurements are made at the output of the conditioning chamber and since the moisture measurements are usually associated with changes from one moisture content to another, the control is not completely satisfactory. The conductivity measurement is performed after processing and does not take into account factors within and associated with the conditioning chamber. These factors include temperature, drying capacity and inertia effects. In addition, the measurement of the moisture content at the end of the processing indicates that the rate of drying should be changed, thus a delay occurs between obtaining the measurement and changing the drying rate. Thus when the wrong measurement is sensed, say the material is too moist, the control signals cause a rapid build up in the feed rate. This build up shortens the drying period until the material become overdry. Then, the sensing of the overdry material causes a decrease in the feed rate. Thus, the feed rate tends to increase above and decrease below the proper feed rate so that the required moisture control is not achieved. In practice, the rate of feed performs a damped sinusoidal oscillation about the desired rate.

For example, consider a drying machine designed to treat a fabric of a certain weight. Assuming that, for the purpose of obtaining an accurate drying with a predetermined percentage of moisture, this fabric must pass through the drying chamber machine at a speed of sixty yards per minute. If the machine contains one hundred and twenty yards of fabric, the passage will then take place in two minutes. When the fabric is followed by another fabric of a different weight, due to a different moisture content, the drying speed required for producing the same percentage of moisture in the fabric treated is different. The feed rate of the machine should change. As soon as a measuring means, located at the output of the conditioning chamber contacts the material of heavier weight, i.e., containing more moisture, the measuring means starts transmitting "slow-down" signals until the moisture in the material is of the right amount. However, the apparatus has not taken into account the inertia mass of the machine or the time lag so that the feed rate continues to decrease and the material is overdried. Then the aypparatus gives "speed-up" signals. A damped oscillation about the desired value continues for a certain time before becoming stabilized. In general, this sinusoidal motion continues at least long enough to make the automatic adjustment ineffectual for shorter lengths of material.

Another problem that arises with such machines is related to the length of the material inside the machine. In the case of a stoppage of the machine, which occurs frequently, the material (fabric) in the machine becomes overdried. The control apparatus, upon resumption of machine operation, has an overdried fabric in contact with the measuring means and therefore, transmits "speed-up" signals. The known machines are provided with an automatic release which, after each stoppage, disables the control apparatus for a fixed period of time to allow the overdried material to pass through uncontrolled. This method is intended to avoid too sinusoidal an operation of the machine with automatic control. However, in many instances too much or too little material is fed through the conditioning chamber before the fixed delay period terminates and material is wasted.

It is therefore an object of the invention to provide improved apparatus for controlling the amount of moisture in a material.

It is another object of the invention to provide in moisture conditioning apparatus of the type which feeds a material through a conditioning chamber, an improved moisture sensing means which directs a control means to change the rate of feed when the measured moisture content is different from the desired moisture content without an accompanying oscillation of the rate of feed about the required rate.

It is yet another object of the invention to provide in moisture conditioning apparatus means which permit the correct conditioning of a new material as its enters the chamber so that there is only a minimum of improperly conditioned material.

It is a still further object of the invention to provide improved means for delaying the resumption of control of the feed rate upon restarting the machine after an interruption of the conditioning.

It is yet a further object of the invention to provide improved delay means for delaying the resumption of control of the feed rate so that neither too little nor too much material passes through the conditioning chamber without being subject to a feed control.

In accordance with one embodiment of the invention, apparatus is provided for measuring the moisture content of a material being fed through a moisture conditioning chamber and of controlling the rate of feed of the material through the moisture conditioning chamber. The apparatus comprises a moisture measuring means disposed within the moisture conditioning chamber to measure the moisture content of the material during conditioning. A moisture standard means is preset to indicate a value related to the percentage of moisture desired in the material being conditioned. A comparison means compares the value indicated by the moisture standard means and the value obtained by the moisture measuring means. Whenever the comparison means detects a difference between the two values, control means are activated which change the rate of feed so that the material leaving the moisture conditioning chamber contains the desired percentage of moisture.

Associated with the apparatus is a delay means which is operative whenever there is a resumption of material feed after an interruption. The delay means prevents operation of the feed rate control means for a period of time related to the difference between the moisture content of the material in the conditioning chamber and the desired moisture content.

It should be noted that by comparing the actual moisture content of the material within the conditioning chamber against a standard moisture content as opposed to detecting changes in the moisture content at the output of the conditioning chamber, a truer change in drive speed is obtained with a minimum of oscillations.

It should also be noted that by employing a delay means in accordance with one aspect of the invention, a more reliable feed control is obtained. For example, when there is a short interruption there will be a negligible difference in moisture contents and there will be little or no delay until the feed control becomes operative. Thus very little material passes uncontrolled through the moisture conditioning chamber. Likewise, after a long interruption, the difference is very great and a long delay insures that all the overdried material is past the moisture measuring means before the control becomes operative, thus preventing an unrealistic oscillation of the feed rate. A fixed delay may be too short under this condition.

Although there are moisture measuring means which permit the measurement of the percentage of moisture contained in materials when the moisture content is very low, and when the resistance of the material is very high they have created a need for even better means. In addition, wool, cotton and artificial silk with very low moisture content contain changes of static electricity which may be considerable. These are usually negative charges which adversely affect the electrical measuring elements, thereby making such measurements extremely difficult.

Accordingly, a feature of the invention is an improved moisture measuring means which can measure the conductivity of semiconductive materials which either present a very high resistance or carry a charge of static electricity. The measuring means includes an amplifying means responsive to electrodes which partially cancel and transform the static electric charge to a useful signal source.

Other objects, features and advantages of the invention will be be evident from the following detailed description when read in connection with the accompanying drawings wherein.

Figure 1:
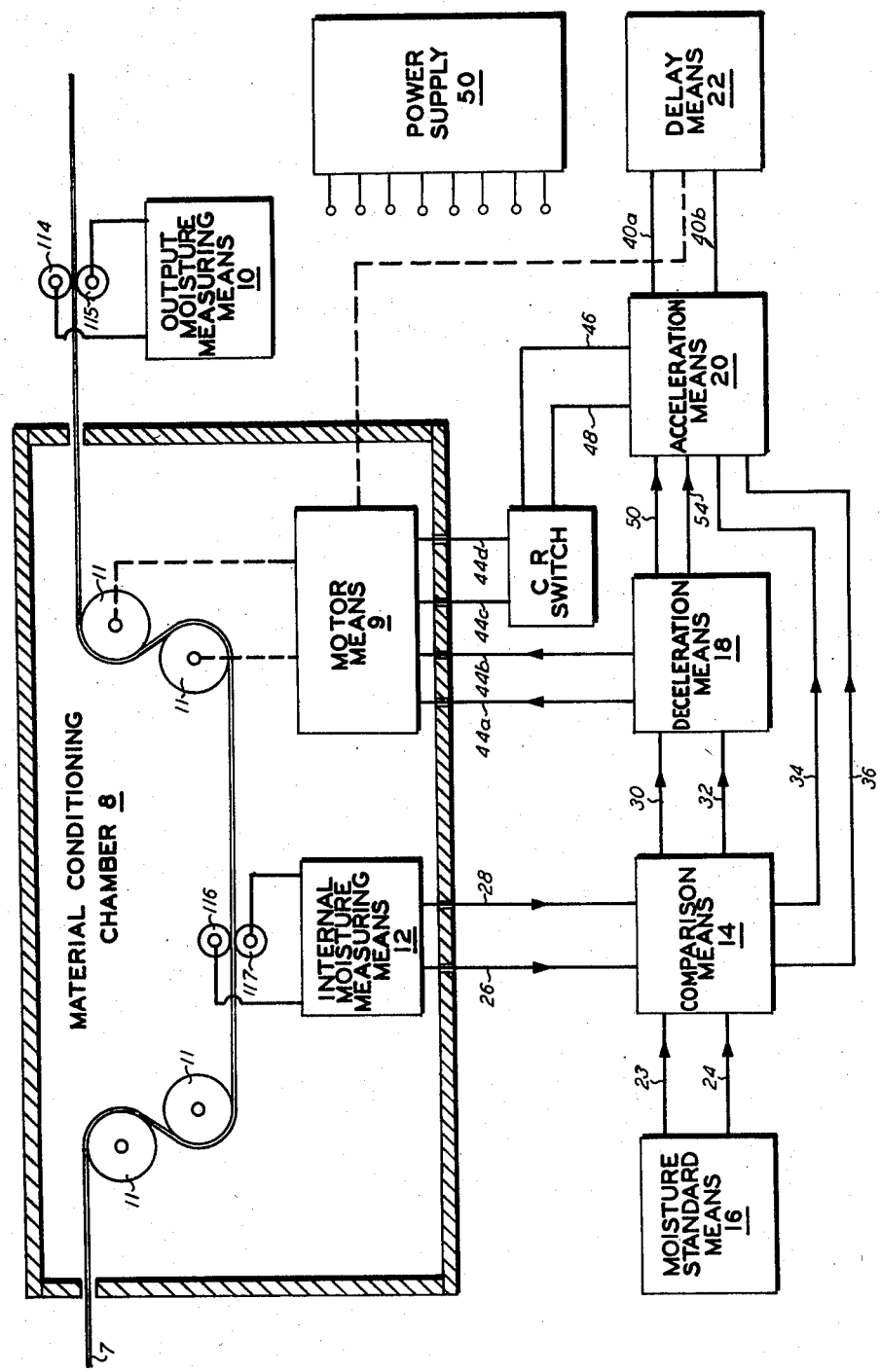
Fig. 1 is a block diagram showing a preferred embodiment of the apparatus for measuring the moisture content of a semi-conductive material being fed through a moisture conditioning chamber, and for controlling the rate of feed through the chamber.

Referring to Fig. 1, apparatus is shown in accordance with a preferred embodiment of the invention. The apparatus measures the moisture content of a material such as a textile fabric which is being fed through a material conditioning chamber. The moisture content is measured twice, once within the material conditioning chamber, and again at the output of the material conditioning chamber. The measurement within the material conditioning chamber is for controlling the rate of feed of the material through the chamber, while the measurement at the output is for recording the final moisture content of the material.

The apparatus generally comprises a motor means 9 for feeding a material 7 via rollers 11 through a material conditioning chamber 8; an output moisture measuring means 10; an internal moisture measuring means 12 located within the moisture conditioning chamber 8; a comparison means 14, a moisture standard means 16; a deceleration means 18; an acceleration means 20. The motor means 9 although shown for convenience inside the material conditioning chamber 8 is preferably located outside.

Initially, the moisture standard means 16 is adjusted to transmit signals via the lines 23 and 24 to the comparison means 14. The magnitude of these signals is related to the moisture content desired in the material to be processed. As the material being processed is fed through the material conditioning chamber 8 by motor means 9, the internal moisture measuring means 12, located within the material conditioning chamber 8, measures the moisture content of the material. The material passes between the electrodes 116 and 117 of the internal moisture measuring means 12. The electrodes 116 and 117 are preferably in the form of rollers. The conductivity of the material is measured to give an indication of the moisture content. However, other electrical characteristics of the material may be measured to determine moisture content.

The internal moisture measuring means 12 transmits signals via the lines 26 and 28 to the comparison means 14. The magnitude of the signals is related to the actual moisture content of the material being processed within the material conditioning chamber 8. If the signals from the internal moisture measuring means 12 are equal in magnitude to the signals from the moisture standard means 16, no signals are transmitted by the comparison means 14. If the signals from the internal moisture measuring means 12 are greater in magnitude than the signals from the moisture standard means 16, indicating that the actual moisture content is greater than the desired moisture content, the comparison means 14 transmits signals via the lines 30 and 32 to the deceleration means 18. The deceleration means 18 transmits deceleration pulse signals via the lines 44a and 44b to the motor means 9 to slow up the feed rate. The frequency of the deceleration pulse signals is proportional to the amplitude of the signal received from the comparison means 14.

If, however, the signals from the internal moisture measuring means 12 are of smaller amplitude than the signals from the moisture standard means 16, indicating that the actual moisture content is less than the desired moisture content, the comparison means 14 transmits signals via the lines 34 and 36 to the acceleration means 20. The acceleration means 20 transmits acceleration pulse signals via a circuit which includes the lines 44c and 44d to the motor means 9 to speed up the feed rate. The frequency of the acceleration pulse signals is proportional to the amplitude of the signals received from the comparison means 14.

If, for any reason, the drive means is stopped while material is in the moisture conditioning chamber and then restarted, the delay means 22 is activated. The delay means 22 prevents the operation of the acceleration means 20. Delay means 22 receives signals from the line 38, the amplitudes of these received signals being directly related to the difference between the actual moisture content of the material and the desired moisture content. The amplitude of the signals determines the length of time the delay means 22 prevents the operation of the acceleration means 20. If the difference is great, the acceleration means 20 is inhibited long enough to permit the overdried material to move past the internal moisture measuring means 12 preventing an unrealistic overacceleration of the motor means 9. If the difference is slight, the acceleration means 20 is essentially available for operation immediately.

As the material leaves the output or exit of the moisture conditioning chamber, its actual moisture content is accurately recorded. The material passes over a pair of electrodes 114 and 115, preferably rollers. The electrodes 114 and 115 associated with the output moisture measuring means 10 cooperate with this means to measure and record the conductivity of the material. The structure of the electrodes, hereinafter more fully described, and their disposition with respect to the elements of the output moisture measuring means 10 permit extremely sensitive measurements even when static electricity is on the surfaces of the material.

Figure 3:
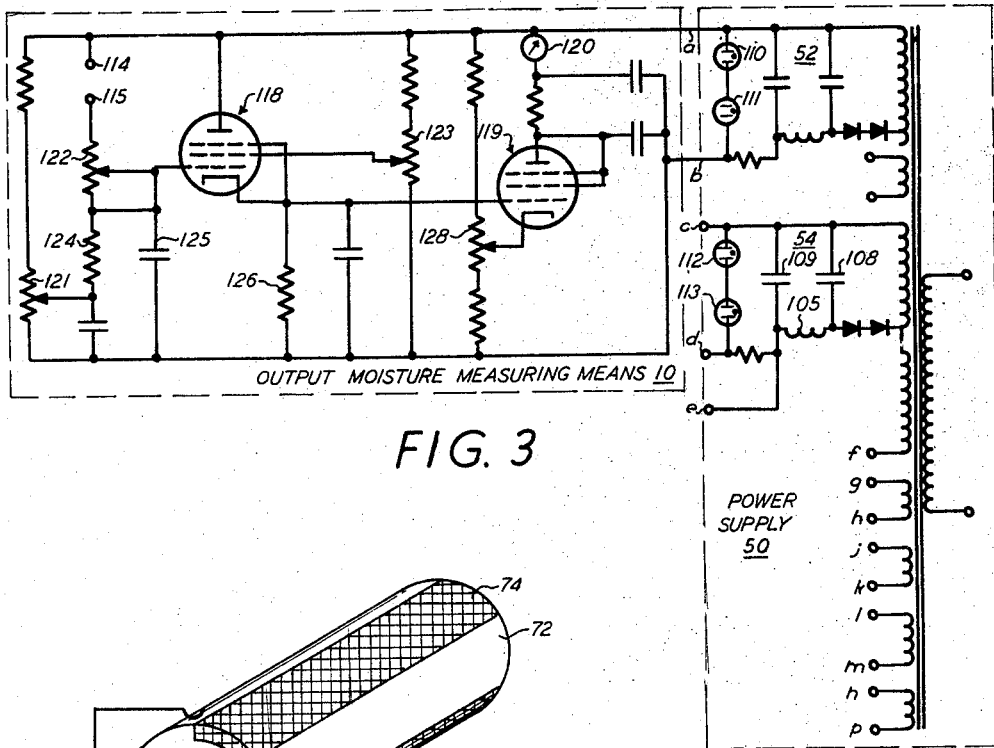
Fig. 3 shows the power supply and a moisture measuring means associated with the apparatus of Fig. 1 and Fig. 2.
Figure 4:
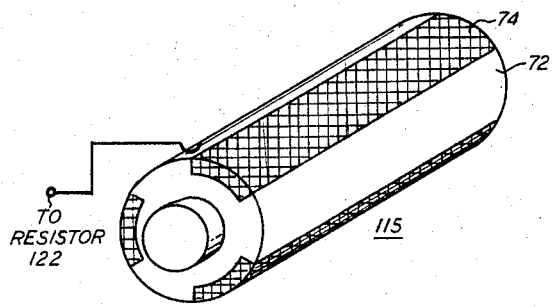
Fig. 4 shows one embodiment of an electrode of moisture measuring means of the apparatus of Fig. 1.

The circuits of the output moisture measuring means 10, as shown in Fig. 3, comprise a first pentode vacuum tube 118 whose control grid receives a potential depending on the percentage of moisture contained in the material being conditioned. This potential is determined by the changes of the current passing through the material between the electrodes 114 and 115 (Fig. 1). In order to compensate for the influence of static electricity, the circuits are not only completely isolated from ground, but also the conductivity sensing means includes two electrodes 114, 115 in the form of rollers. The electrode 114 is of a conductive material while the electrode 115 comprises conductive segments 72 (Fig. 4) separated by segments of insulating material 74. Consequently, since the electrostatic charge is always negative and the electrode 114 (Fig. 3) is connected via the line a to a positive potential in the power supply 50, the electrostatic charge on the side of the material in contact with the electrode 114 is cancelled. The other side of the material, very dry wool, for example, also has this negative electrostatic charge. However, as the material rolls over the electrode 115 (Fig. 4) the material is charged negatively when rubbing against the conductive segments 72 and is charged positively when rubbing against the segments of insulating material 74. Since the material is a semiconductor, these electrostatic charges do not move to the side of the material in contact with the electrode 114. Thus, every time the material passes over an insulating segment, an electrostatic charge of opposite polarity is produced (i.e. positive charge) and the original electrostatic charge in the area is cancelled and transformed. Since the charges are thus alternately positive and negative a pulsating alternating current is transmitted from the electrode 115 (Fig. 3) to the resistors 122 and 124 and the capacitor 125.

Figure 5:
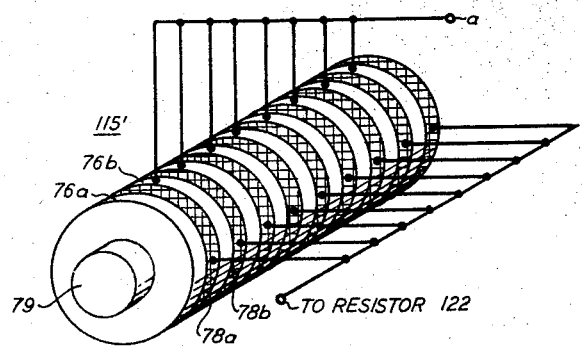
Fig. 5 shows a second embodiment of an electrode employed by the apparatus of Fig. 1 for measuring the moisture content of a semiconductive material.

The pulsating alternating current charges the capacitor 125 to a voltage dependent on the amplitude of the alterating current. The amplitude of this current is related to the electrostatic charge on the surface of the material in contact with the electrode 115. This electrostatic charge is inversely related to the quantity of moisture in the material (the greater the percentage of moisture the smaller the quantity of electrostatic charge). Thus, the voltage developed across the capacitor 125 is related to the moisture content of the material. In the case of extremely low percentages of moisture, or if it is impossible to have the material suffer any compression resulting from passing between a pair of oppositely disposed rollers, the electrodes 114 and 115 may be replaced by the single roller 115' shown in Fig. 5. The roller 115' comprises a plurality of conductive laminations 76 interposed with insulative laminations 78 mounted on a common shaft 79. The conductive laminations 76 are coupled to the positive potential a and the insulative laminations 78 are coupled to the resistor 122.

By changing the thickness of the insulative laminations 78 an increase in sensitivity is obtained because smaller current paths are presented by thinner laminations.

In any case, the variations of the control grid potential of the pentode vacuum tube 118 (Fig. 3), created by the passage of the material between the electrodes 114 and 115, or above electrode 115', cause proportional changes of its cathode current. The changes in cathode current develop changing potentials across the resistor 126 in the cathode circuit of the vacuum tube 118. The changing potentials are applied to the control grid of the second tube 119, a pentode connected as a conventional triode amplifier. The anode current of the vacuum tube 119 is measured by means of a milliammeter 120, whose indicator deflection represents percentages of moisture.

Adjusting means are provided for calibrating the milliammeter 120. A potentiometer 121 is used to establish the maximum point of the scale, and a potentiometer 123, the adjustment point in the middle of the scale. These three adjustments also make it possible, with a resistance of suitable value inserted between the electrode 115 and the parallel combination of the resistance 124 and the capacitor 125, to establish any scale range, i.e. to modify the sensitivity of the apparatus in accordance with the percentage of moisture to be measured. A potentiometer 128 permits the adjustment of the potential of the cathode of the tube 119, which considerably simplifies the readjustment of the entire measuring circuit when a vacuum tube has to be replaced.

In contradistinction to known measuring circuits, the above described apparatus has the advantage of working with much weaker control grid currents and thereby insures a much greater stability of the measurements over a period of time, and at the same time, a much greater sensitivity.

Thus, an extremely sensitive measuring device has been disclosed for measuring the moisture content of a material. The moisture measuring means by employing roller type electrodes and vacuum tube amplifiers permits measurements of materials having extremely low conductivities. In addition, by virtue of the construction and disposition of the electrodes with respect to the other circuit elements, conductivity measurements of materials containing a static electricity charge are possible.

Since the circuits of the internal moisture measuring means 12 are the same as for the output moisture measuring means 10 except for the construction and disposition of the electrodes 116 and 117, primed reference characters are employed in the schematic diagram of Fig. 2 and only the differences will be described.

Figure 2:
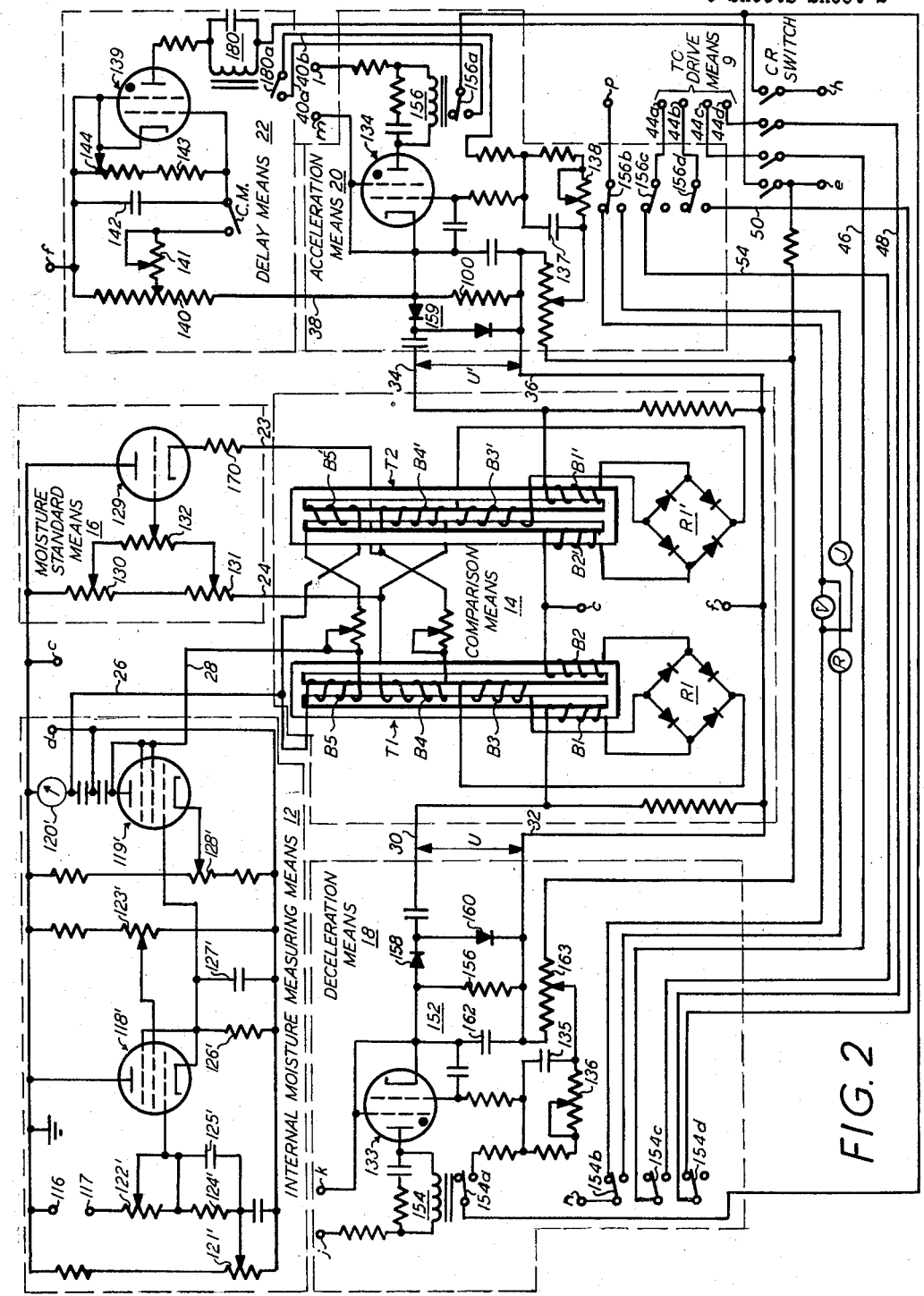
Fig. 2 shows in schematic form the major components of the block diagram of Fig. 1.

Referring to Fig. 2, the electrode 116, which is preferably a conductive roller, is coupled via the line c to a grounded positive side of a direct current voltage of the power supply. The electrode 117 which is also preferably a conductive roller is connected via a resistor 122' to the control grid of the vacuum tube 118'. Thus, as the resistance of the material between the rollers changes, the potential of the control grid changes and the current flowing through the milliammeter 120' changes in the previously described manner.

It should be noted that the anode circuit of the vacuum tube 119' includes the lines 26 and 28 so that the current flow can be sensed by the comparison means 14.

The moisture standard means 16 is basically an adjustable current source. The moisture standard means 16 is coupled to the comparison means 14 by the lines 23 and 24, so that the current flow may be sensed by the comparison means 14. The current flow is adjusted by taking into account physical and chemical properties of the material to conform with a value related to a desired quantity of moisture in a material being sampled.

The moisture standard means 16 comprises a vacuum tube 129 whose cathode is coupled via a resistor 170 to the line 23, and a control grid coupled to the network of potentiometers 130, 131 and 132. The potentiometers are so disposed to permit the adjustment of current flow. The potentiometer 130 permits a zero adjustment, the potentiometer 131 is a full scale adjustment, and the potentiometer 132 is provided with a scale similar to that of the milliammeter 120 to permit the adjustment of the current flow to the percentage of moisture desired for the finished material.

In particular, the potentiometer 132 is provided with a scale similar to the milliammeter 120, i.e., in practice, both have an arbitrary scale having divisions from zero to one hundred, for example. This is done so that the application of the apparatus may be generalized since an indication of a particular current may indicate a first percentage of moisture for cotton and a different percentage of moisture for wool. It is, therefore, more practical to replace the indication of a particular current by an arbitrary value and then calibrate scales to give indications of percentages of moisture for different materials. Thus, it is also possible to measure the moisture content of composite materials. The arbitrary scale of the milliammeter 120 and the potentiometer 132, thus correspond indirectly to a current value, which in turn corresponds to a value of conductivity.

This conductivity is determined, on the one hand, by the chemical and physical composition of the material being controlled. This is fixed for a given material. On the other hand, the conductivity is determined by the percentage of moisture which is variable and it is this variability that is monitored. In other words, if several fabrics of the same material are treated differently (dyed, etc.) but are absolutely dry and the apparatus is adjusted by the potentiometers 121, 122 and 123 of the output moisture measuring means 10 to indicate zero then only the variations are produced by the moisture content of the material.

The comparison means 14 comprises two magnetic amplifiers T1 and T2 responsive to the internal moisture measuring means 12 and the moisture standard means 16. The two magnetic amplifiers T1 and T2 are designed to transmit an alternating voltage whose amplitude is related to the magnitudes of the currents from the internal moisture measuring means 12 (via the lines 26 and 28) and from the moisture standard means 16 (via the lines 23 and 24). The magnetic amplifier T1 develops an alternating voltage U across the lines 30 and 32 to control the deceleration means 18. The magnetic amplifier T2 develops an alternating voltage U' across the lines 34 and 36 to control the acceleration means 20.

Each of these magnetic amplifiers has three branches or legs, on which are disposed five coils.

The magnetic amplifier T1 comprises:

(a) Two coils $B_1$ and $B_2$, located on the outer branches, are fed an alternating current by the lines c and f from the power supply 50 to generate opposing magnetic fluxes;

(b) A coil $B_5$, located on the central branch, receives a direct current via the lines 26 and 28 from the internal moisture measuring means 12;

(c) A coil $B_4$ located on the central branch, receives a direct current via the lines 23 and 24 from the moisture standard means 16. The magnetic flux generated is in opposition to that generated by $B_5$.

(d) A coil $B_3$, located on the central branch, receives a direct current fed back via the rectifier R1 from the windings $B_1$ and $B_2$. The magnetic flux established by the current has the same direction as that generated by coil $B_5$.

Magnetic amplifier T2 has the same arrangement, except that the coil $B'_3$ of the feedback circuit generates magnetic flux which is in opposition to that generated by the coil $B'_5$.

The windings of coils $B_5$ and $B'_5$ are in parallel, but phased oppositely to avoid a possible coupling between the magnetic amplifiers T1 and T2; this does not change the method of operation.

When the currents from the internal moisture measuring means 12 and the moisture standard means 16 have the same value, their generated magnetic fields cancel and the magnetic state of the magnetic amplifiers T1 and T2 is unchanged. Since the windings $B_1$ and $B_2$ are in opposition, negligible alternating current flows and both the voltage U and U' are zero. Likewise, no current flows through the coils $B_3$ and $B'_3$.

When the current from the internal moisture measuring means 12 becomes greater than the current from the moisture standard means 16, a magnetic flux is established in the magnetic amplifier T1 directed in a sense which is assumed positive. The coils $B_1$ and $B_2$, fed by the alternating voltage, will carry a current when the direction of the magnetic flux corresponds to the positive sense. The current in coil $B_2$ is rectified and by means of the coil $B_3$, in the feedback path, reinforces the action of the magnetic flux, resulting in the development of an alternating voltage U across the lines 30 and 32. There will also be a tendency to establish a magnetic field in magnetic amplifier T2. However the action of the winding $B'_3$, cancels it since the magnetic flux developed by the winding $B'_3$ is in the opposite direction to that of the winding $B'_5$. The magnetic flux in the magnetic amplifier T2 is not modified, and since the coils $B'_1$ and $B'_2$ are in opposition, the voltage U' remains zero. Thus, there is generated a voltage U when the current from the internal moisture measuring means 12 is greater than the current from the standard moisture means 16. This voltage is substantially proportional to the increase of the current up to the saturation bend of the magnetic circuit, chosen close to the maximum attainable difference of the currents.

The operation is exactly the same for the case of a decrease in the magnitude of the current from the internal moisture measuring means 12 below the magnitude of the standard current. In this case, the magnetic amplifier T2 will develop an alternating voltage U' while T1 will be neutralized by the action of the feedback circuit on $B_3$ and no alternating voltage U is developed.

The voltages U and U' exactly reflect all the factors which intervene, and are used for the control of the accelerating and decelerating means 20 and 18. The comparison means 14 can be considered as an integrating means since its function is to integrate, on the one hand, a value (amount of moisture) determined by the material being processed, and on the other hand, the thermal and physical factors determined by the material being processed, and on the other hand, the thermal and physical factors determined by the drying process.

The deceleration means 18 comprises a thyratron 133, a relay 154 in the anode circuit of the thyratron, and a control network 152. The diode 158, the diode 160, the resistor 156, and the capacitor 162, comprise a rectifier means for converting the alternating voltage U into a negative direct current voltage, for lowering voltage of the cathode with respect to the control grid of the thyratron 133. The capacitor 135 and the potentiometer 136 form a delay network.

The control grid of the thyratron 133 is quiescently held to a negative potential by means of a potentiometer 163, coupled via a resistor and the line e to adjust its release threshold. If the no voltage U is developed, the cathode of the thyratron 133 receives no voltage signal, and the control grid is sufficiently negative to prevent firing. The contacts of the relay 154 remain in idle position.

If the difference between the measured and the desired value of moisture is positive (too moist), the thyratron 133 receives on its cathode a negative voltage, and the potential of the cathode approaches that of the control grid. The potential difference between control grid and cathode decreases until firing occurs.

During automatic operation the multiple single throw switch CR (shown open in Fig. 2) is closed and a negative voltage is transferred to the normally open relay contacts 154a. Now, when the voltage U reaches a certain minimum amplitude, the thyratron 133 fires, energizing the relay 154, and the normally open relay contacts 154a close. The negative voltage is fed to the control grid of the thyratron 133, and the thyratron 133 is turned off during the negative half of the alternating current cycle of its anode voltage. The negative voltage also charges the capacitor 135. With the thyratron 133 turned off, the relay contacts 154a open. However, the thyratron 133 remains blocked by the charge of the capacitor 135 superimposed on the initial control grid potential. The capacitor 135 discharges into the potentiometer 136 until the control grid voltage is no longer sufficiently negative to prevent the thyratron 133 from firing.

If the alternating voltage U is small, the cathode of the thyratron 133 will only have received a small negative voltage, the grid cathode potential difference is large and it is therefore necessary for the capacitor 135 to be discharged completely before the firing threshold is reached. On the other hand, when the voltage U is large, the cathode receives a large negative rectified voltage, and the grid cathode potential difference is small. The capacitor 135 is charged to the same value as before, but must discharge only slightly before the control grid reaches the firing threshold.

The frequency of the energizing of the relay 154 is thus proportional to the magnitude of the alternating voltage U which is proportional to the difference between the moisture percentage which exists and which is desired. Moreover, this frequency can be adjusted by means of potentiometer 136.

The acceleration means 20, similar to the deceleration means 18, comprises the thyratron 134, the relay 156 and a control network 159. The acceleration means 20 operates in a similar manner to the deceleration means 18 except the period of control grid blocking is dependent on the amplitude of the alternating voltage U'. Thus, the drier the material being sampled, the higher the frequency of energization of the relay 156.

When the relay 154 is energized, the contact 154c closes to complete a circuit to the motor means 9, which decelerates, and when the relay 156 is energized, the contact 156d closes to complete a circuit to the motor means 9 which accelerates.

Thus, when the actual moisture content is greater than the desired moisture content, the current flow from the internal moisture measuring means 12 is greater than the current flow from the moisture standard means 16. This difference in current flow causes the generation of an alternating voltage U by the comparison means 14. The amplitude of the alternating voltage U is directly proportional to the difference in the current flows. The alternating voltage U causes the activation of the deceleration means 18, which transmits deceleration impulses to motor to slow down the feed rate so that the material being processed remains in the material conditioning chamber 8 a longer period of time.

In a similar manner, when the actual moisture content is less than the desired moisture content, the current flow from the internal moisture measuring means 12 is less than the moisture content from the moisture standard means 16. In accordance with this difference the comparison means 14 generates an alternating voltage U' which activates the acceleration means 20. The activation of the acceleration means 20 causes the transmission of acceleration pulses to a motor means 9 which speeds up the feed rate so that the material spends less time in the material conditioning chamber.

It should be noted that the apparatus can also be operated manually. In this case the multiple single throw switch CR is open and lines to the motor means 9 are broken. All control of the motor means 9 becomes dependent on an operator. It is, therefore, necessary to instruct the operator on the state of the material. The signal lights V, R, and J give a visual indication.

When the material is too moist, the generated alternating voltage U causes activation of the deceleration means 18 and the relay 154 is energized. The contact 154b completes a circuit which causes the lighting of the light R to indicate that the material is too moist. Similarly, when the material is too dry, the generated alternating voltage U' causes activation of the acceleration means 20 and in particular the energization of the relay 156. The moving of the contact 156b closes a circuit causing the lighting of the light J to indicate that the material is too dry.

When neither relay is energized, the light V is lit indicating the material being processed contains the desired quantity of moisture.

During automatic operation if the machine is stopped for any reason a delay means controls acceleration of the motor means 9 when the apparatus is restarted. This delay means 22 comprises a thyratron 139, with a relay 180 disposed in its anode circuit. The normally open contacts 180a are used to complete a circuit in the acceleration means 20 which control the rate of generation of acceleration pulses when the material is too dry.

If the machine stops for any reason whatsoever, a switch CM is closed to energize the delay means 22. In particular, a negative potential is transferred from the acceleration means 20 via the line 38, the potentiometers 140 and 141 to the control grid of the thyratron 139. At the same time, this negative potential is charging the capacitor 142. When the machine is restarted the switch CM opens. The thyratron 139 remains blocked until the capacitor 142 discharges through the resistor 143 and the potentiometer 144. While the thyratron 139 is blocked the acceleration means 20 is disabled since the relay contacts 180a are open. However, after a period of time, depending on the resistance in the potentiometer 144, the thyratron 139 again fires and the relay 180 is energized. The contacts 180a close and the acceleration means is again operative. The time of disablement of the acceleration means 20 is regulated according to the length of the fabric passing in the machine by means of the potentiometer 144, and according to the quantity of moisture contained in the material by means of the charging potential applied to capacitor 142. This charging potential is the voltage U' rectified. It is proportional to the difference between the actual moisture content and the moisture content desired.

In case of a very short stoppage of the machine, the capacitor 142 does not receive a sufficient charge to block the thyratron 139, and the delay means 22 does not block the acceleration means 20 after a short stoppage which is unlikely to cause overdrying of the material. Thus, a delay means is provided for controlling the acceleration of the material after a stoppage of the machine. The delay introduced is proportional to the difference in moisture content so that a more reliable control of the drying process is obtained.

Fig. 3 in addition to containing the output moisture measuring means 10 also includes the power supply comprising a first source of direct current 52, a second source of direct current 54, and a plurality of alternating current sources.

The first source of direct current 52 is a conventional regulated power supply that is highly regulated by the gaseous discharge tubes 110 and 111. The direct current source 52 is used solely for the moisture detection means 10.

The second source of direct current 54, another conventional regulated power supply, is used to furnish the direct current voltages required by the vacuum tube amplifiers of the remainder of the components of Fig. 1. The remainder of the power supply 50 are a plurality of alternating current voltages which primarily supply anode power for the various thyratrons of the apparatus and the magnetic amplifiers T1 and T2.

For the sake of clarity, all connections between the power supply 50 and the components of Fig. 2 are designated by small letter reference characters.

There will be now obvious to those skilled in the art many modifications and variations utilizing the principles set forth and realizing many or all of the objects and advantages of the circuits described but which do not depart essentially from the spirit of the invention.

What is claimed is:

1. Apparatus for controlling drive means which feeds a semiconductive material through a moisture conditioning chamber comprising moisture measuring means for measuring the moisture content of the semiconductive material passing through the moisture conditioning chamber, said moisture measuring means generating a signal related to the percentage of moisture in the semiconductive material, moisture standard means, said moisture standard means generating a signal related to a predetermined percentage of moisture in the semiconductive material, said moisture standard means being controllably variable, and comparison means responsive to said moisture measuring means and said moisture standard means, said comparison means generating control signals having a predetermined relation to the relationship of the signals generated by said moisture measuring means and said moisture standard means, the control signals regulating the speed of said drive means, said comparison means including a magnetic amplifying means having a first control means responsive to said moisture measuring means and a second control means responsive to said moisture standard means, a source of power, and a power transfer means responsive to said source of power, said power transfer means being connected to and actuated by said comparison means, said power transfer means transferring control signals to said drive means as determined by the relationship between the signals generated by said moisture measuring means and said moisture standard means.

2. Apparatus for controlling drive means which feeds a semiconductive material through a moisture conditioning chamber comprising moisture measuring means for measuring the moisture content of the semiconductive material passing through the moisture conditioning chamber, said moisture measuring means generating a signal related to the percentage of moisture in the semiconductive material, moisture standard means, said moisture standard means generating a signal related to a predetermined percentage of moisture in the semiconductive material, said moisture standard means being controllably variable, and comparison means responsive to said moisture measuring means and said moisture standard means, said comparison means generating control signals having a predetermined relation to the relationship of the signals generated by said moisture measuring means and said moisture standard means, the control signals regulating the speed of said drive means, said comparison means including a source fo power, a first magnetic amplifier having a first control winding responsive to said moisture measuring means, a second control winding responsive to said moisture standard means and transfer windings responsive to said source of power, said transfer windings transferring power to said drive means whenever the amplitude of the signal generated by said moisture measuring means is greater than the signal generated by said moisture standard means, the quantity of power transferred being related to the difference in amplitude of the generated signals and a second magnetic amplifier having a first control winding responsive to said moisture measuring means, a second control winding responsive to said moisture standard means and transfer windings responsive to said source of power, said transfer windings transferring power to said drive means whenever the amplitude of the signal generated by said moisture standard means is greater than the signal generated by said moisture measuring means, the quantity of power transferred being related to the difference in amplitudes of the generated signals.

3. Apparatus for controlling drive means which feeds a semiconductive material through a moisture conditioning chamber comprising moisture measuring means for measuring the moisture content of the semiconductive material passing through the moisture conditioning chamber, said moisture measuring means generating a signal related to the percentage of moisture in the semiconductive material, moisture standard means, said moisture standard means generating a signal related to a predetermined percentage of moisture in the semiconductive material, said moisture standard means being controllably variable, and comparison means responsive to said moisture measuring means and said moisture standard means, said comparison means generating control signals having a predetermined relation to the relationship of the signals generated by said moisture measuring means and said moisture standard means, the control signals regulating the speed of said drive means, said comparison means includes, a power source, a first magnetic amplifier, a first pulse generator responsive to said first magnetic amplifier, a second magnetic amplifier, a second pulse generator responsive to said second magnetic amplifier, said first magnetic amplifier including a first control winding responsive to said moisture measuring means, a second control winding responsive to said moisture standard means, and transfer windings coupling said power source to said first pulse generator, said first and second control windings being so disposed to permit the transfer of power by said transfer windings whenever the signal generated by said moisture measuring means is greater than the signal generated by said moisture standard means, the magnitude of the transferred power being related to the difference of the amplitudes of the generated signals, said first pulse generator transmitting decelerating pulse signals to the drive means, the pulse frequency being dependent on the magnitude of the transfer of power, said second magnetic amplifier having a first control winding responsive to said moisture measuring means, a second control winding responsive to said moisture standard means, transfer windings for transferring power from said power source to said second pulse generator, said first and second control windings being disposed to permit the transfer of power by said transfer windings whenever the signal generated by said moisture measuring means is smaller in amplitude than the signal generated by said moisture standard means, the magnitude of the transferred power being dependent on the difference in amplitudes of the generated signals, said second pulse generator transmitting acceleration pulse signals to the drive means, the pulse frequency of said acceleration pulse signals being dependent on the magnitude of the transferred power.

References Cited in the file of this patent

UNITED STATES PATENTS

| | | |
|---|---|---|
| 2,244,722 | Norcross | June 10, 1941 |
| 2,460,199 | Taylor | Jan. 25, 1949 |
| 2,535,948 | Anderson | Dec. 26, 1950 |
| 2,702,948 | Seney | Mar. 1, 1955 |
| 2,703,386 | Seney | Mar. 1, 1955 |
| 2,759,149 | Hart | Aug. 14, 1956 |